United States Patent [19]

Nagata

[11] Patent Number: 5,273,260
[45] Date of Patent: Dec. 28, 1993

[54] SEAT SUSPENSION DEVICE FOR AUTOMOTIVE SEAT

[75] Inventor: Kojiro Nagata, Akishima, Japan

[73] Assignee: Tachi-S Co. Ltd., Akishima, Japan

[21] Appl. No.: 794,404

[22] Filed: Nov. 19, 1991

[51] Int. Cl.$^5$ ............................................. F16F 5/00
[52] U.S. Cl. ................................... 267/131; 267/177; 297/344.15; 296/65.1
[58] Field of Search ............... 267/103, 131, 133, 166, 267/167, 177, 142; 248/563, 575, 585, 588; 297/338, 345; 296/65.1

[56] References Cited

U.S. PATENT DOCUMENTS

| | | | |
|---|---|---|---|
| 3,601,351 | 8/1971 | Ambrosius | 248/585 |
| 3,756,552 | 9/1973 | Wilhelms et al. | 248/575 |
| 3,788,697 | 1/1974 | Barton et al. | 248/585 |
| 4,047,759 | 9/1977 | Koscinski | 248/587 |
| 4,471,934 | 9/1984 | Meiller et al. | 267/177 X |
| 4,659,052 | 4/1987 | Nagata | 267/177 |
| 4,946,145 | 8/1990 | Kurabe | 267/131 |
| 5,011,109 | 4/1991 | Nagata | 297/345 |

FOREIGN PATENT DOCUMENTS

| | | | |
|---|---|---|---|
| 462386 | 1/1950 | Canada | 296/65.1 |
| 1405219 | 10/1968 | Fed. Rep. of Germany | 296/65.1 |

*Primary Examiner*—Robert J. Oberleitner
*Assistant Examiner*—Kevin D. Rutherford
*Attorney, Agent, or Firm*—Oldham, Oldham & Wilson Co.

[57] ABSTRACT

A seat suspension device for an automotive seat, in which an upper frame is movably connected with a lower frame via an X-shaped link in a vertically movable manner, with the arrangement that an upwardly curved section is formed at the frontal part of the upper frame whereas a downwardly curved section is formed at the frontal part of the lower frame, and that a damper is interposed vertically between those upwardly and downwardly curved sections.

6 Claims, 2 Drawing Sheets

SEAT SUSPENSION DEVICE FOR AUTOMOTIVE SEAT

BACKGROUND OF THE INVENTION

1. Field of the Invention

The present invention relates to a seat suspension device provided in an automotive seat, and in particular to an arrangement in the seat suspension wherein a hydraulic damper is disposed.

2. Description of Prior Art

Conventionally, a seat suspension device used in an automotive seat is of such a basic construction that a pair of X-shaped links are interposed between an upper frame on which a seat cushion is mounted and a lower frame fixed to a floor of the automobile, with a hydraulic damper being disposed therein. Typically, the hydraulic damper is disposed aslant between the upper and lower frames with a view to making greater the vertical movable range of the upper frame with respect to the lower frame. In other words, such arrangement is intended for eliminating any limit against the vertical movable range of the upper frame relative to the lower frame.

However, in most instances, this kind of hydraulic damper is generally disposed at a center point beween the two X-shaped links, acting as a means for buffering an impact applied to the upper and lower frames. This construction has been found defective in that the hydraulic damper is just situated beneath the seat cushion, thus posing the likelihood that, when a heavy occupant sits on the seat, the seat cushion will be lowered to contact with the hydraulic damper, leaving an unpleasant feeling. Further, by the reason of the damper being disposed aslant, a repercussive force given from the damper is oriented aslant in relation to the vertical direction of a load applied to the upper frame, with the result that no full repercussive force is exerted from the damper against the load and thus the upper frame is lowered so quickly that the occupant may not feel any comfortable bottoming touch of the seat. In this aspect, the seat suspension device having the hydraulic damper disposed vertically between the upper and lower frames is superior to that one in terms of achieving a proper repercussive force or slow, comfortable bottoming touch of the seat, since the repercussive force of the damper corresponds in direction to a load applied to the upper frame. Yet, this vertical type of damper has also been found defective in that the distance between the upper and lower frames must be widened more in order to install the damper in an upright state between the two frames, which results in increasing the height of the seat to shorten the distance between the seat and the cabin ceiling.

SUMMARY OF THE INVENTION

With the above-stated drawbacks in view, it is thus a purpose of the present invention to provide an improved seat suspension device for an automotive seat which eliminates those drawbacks inherent in the prior-art seat suspension with a vertically installed dameper.

To accomplish such purpose, according to the present invention, the upper and lower frames of suspension device are so formed that an upwardly curved section is defined in a frontal part of the upper frame, whereas a downwardly curved section is defined likewise in a frontal part of the lower frame. A damper is provided between those upwardly and downwardly curved sections. Thus, the damper is installed in the suspension device as it is, to thereby enable showing directly its repercussive effect for best cushiony effect, and further there is no need to make greater the distance between the upper and lower frames. Of course, the damper itself is in now way projected to contact with the major bottom area of seat cushion mounted on the upper frame.

In one aspect of the invention, therefore, the upwardly curved section is disposed in between the thigh portions of occupant on the seat, thus avoiding a hindrance to him or her, and further the formation of dowardly curved section permits a slide rail to be provided at its both lateral non-curved sections, without increasing the height of the lower rail.

In another aspect, such forward protrusion of upwardly curved section in the seat cushion advantageously serves as a stopper to prevent an occupant thereon from being fowardly thrown out in a collision case or the like.

DETAILED DESCRIPTION OF PREFERRED EMBODIMENTS OF THE INVENTION

Referring to FIGS. 1 through 4, there is illustrated a seat suspension device in accordance with the present invention.

Figure 1:
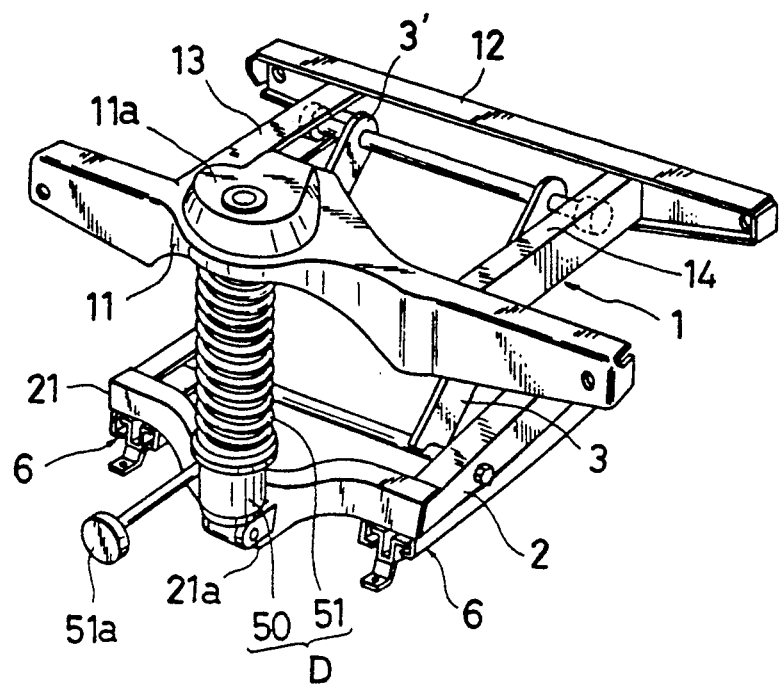
FIG. 1 is a perspective view of a seat suspension device in accordance with the present invention, in which a damper is vertically provided.
Figure 2:
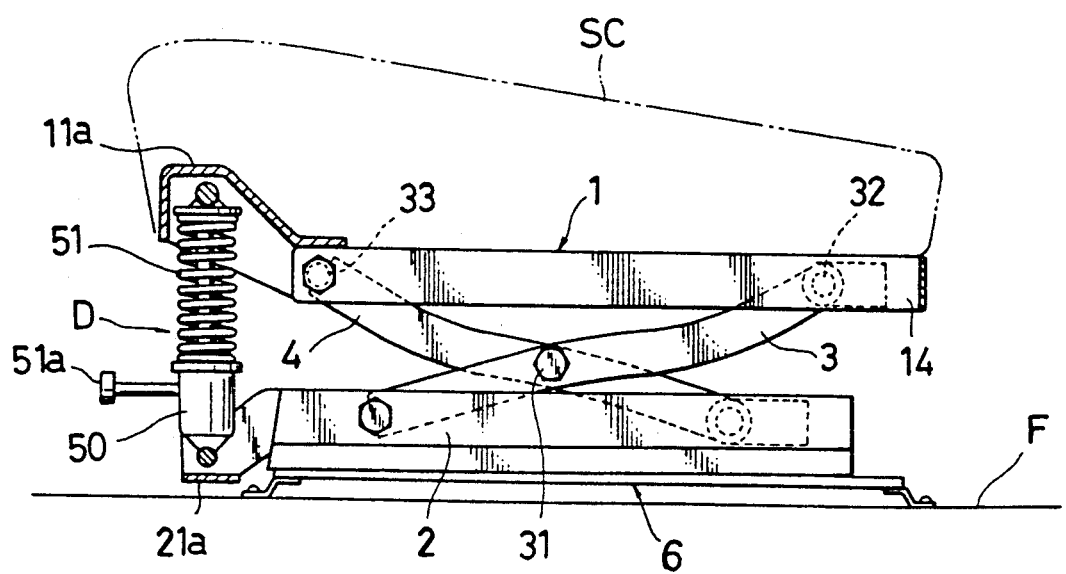
FIG. 2 is a schematic sectional view of the seat suspension device as in FIG. 1.

Designation (1) denotes an upper frame upon which is to be mounted a seat cushion (SC) as indicated by the phantom line in FIG. 2. The upper frame (1) is of a rectangular shape, comprising a forward frame member (11), a rearward frame member (12), and a pair of lateral frame members (13)(14) disposed between the forward and rearward members (11)(12). The position of the forward frame member (11) stands at the front side of the seat cushion (SC).

Designation (2) denotes a lower frame fixed on the floor of an automobile. The lower frame (2) is also of a rectangular shape, having a forward frame member (21) located under the forward frame member (11) of upper frame (1). As can be seen from FIGS. 1 and 3, between the upper and lower frames (1)(2), there are provided a pair of X-shaped links (3, 4)(3', 4') such as to be vertically movable via a movable shaft (32) and a fixed shaft (33), with a torsion bar (not shown) equipped therein to give an upward elastic force to the X-shaped links per se to resiliently bias the upper frame (1) in the upward direction. The X-shaped links are formed in a known construction, and specific explanation is deleted thereon.

Figure 3:
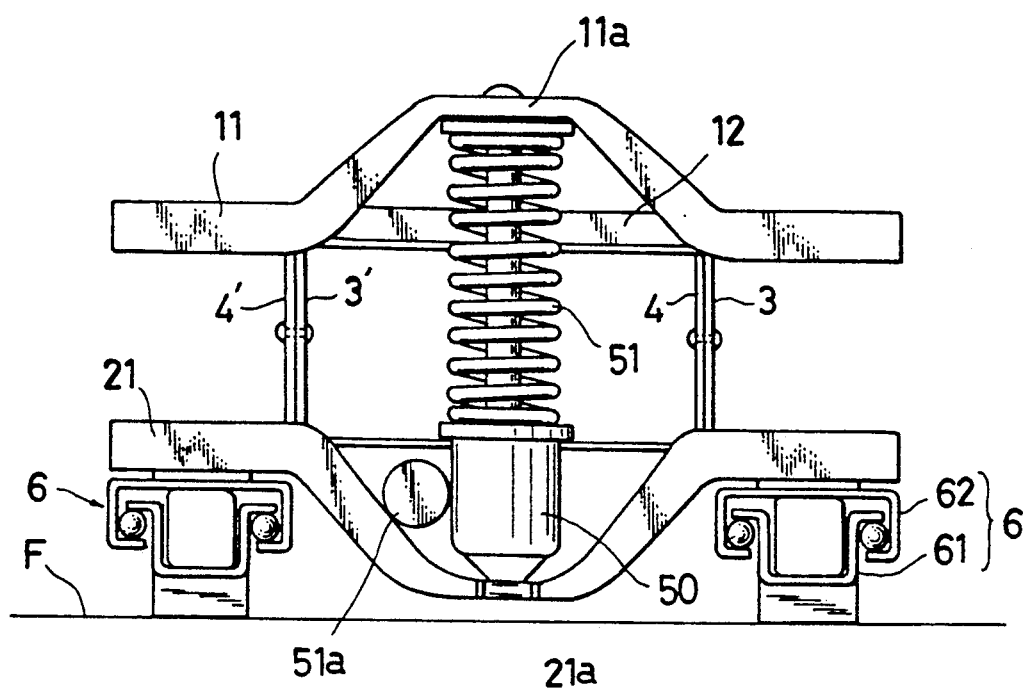
FIG. 3 is a front elevation of the same seat suspension device as in FIG. 2.
Figure 4:
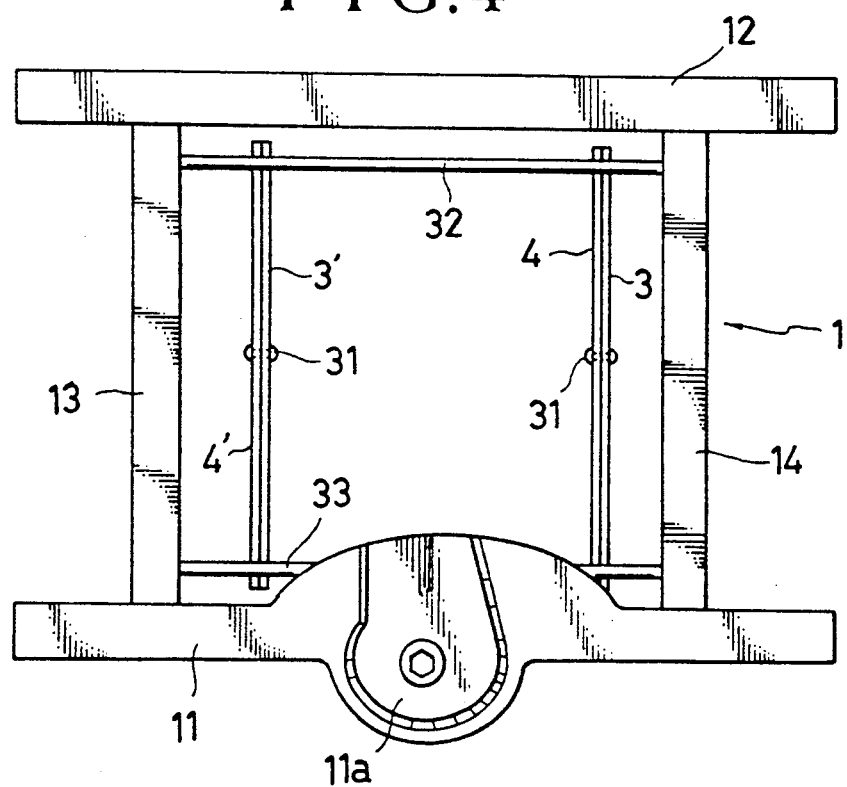
FIG. 4 is a plan view of the device, as viewed from above.

The forward frame member (11) of upper frame (1) is formed with an upwardly curved section (11a), generally at the center point thereof, whereas the forward frame member (21) of lower frame (2) is formed with a downwardly curved section (21a), such that both upwardly and downwardly curved sections (11a)(21a) are disposed at the same point, extending in a direction away from each other along a vertical line in a symmetrical relation relative thereto, as best seen from FIG. 3.

A damper (D) is interposed between those two curved sections (11a)(21a) respectively of upper and lower frames (1)(2), extending generally vertically therebetween. The damper (D) is composed of a hydraulic damper body (50) and a compression coil spring (51) wound around the piston rod of the damper body (50). Designation (51a) stands for an operation knob for adjusting the repercussive force of the coil spring (51).

The upper end of piston rod of damper body (50) is pivotally connected to the top central part of the upper frame upwardly curved section (11a), and on the other hand, the lower end of damper body (50) is pivotally connected to the bottom central part of the lower frame downwardly curved section (21a).

A pair of slide rails (6)(6), each comprising an upper rail (62) and a lower rail (61), are each provided at the respective lateral frame sections of lower frame (2). Thus, the lower frame (2) is fixed via those slide rails (6)(6) to the floor (F).

Now, with reference to FIG. 3, it can be observed clearly that the upper end of the damper (D) is situated at a high point with respect to the upper plane of upper frame (1) on which is mounted the seat cushion, and the lower end of damper (D) is situated at a low point with respect to the lower plane of lower frame (1) which is fixed to the slide rails (6)(6), whereupon a sufficient vertically movable range or stroke is given to the damper (D). It can also be noted that the lower end of damper (D) is lowered down into the spacing between the two slide rails (6)(6), which is quite advantageous in making greater the vertical length or strokes of damper (D).

With above-described construction, the present invention is endowed with the following advantages:

(1) Since the hydraulic damper is not located under the seat cushion and further disposed vertically, the upper frame can be lowered at a lowest possible level, which permits making lower the seat height and increasing the thickness of seat cushion.

(2) The upwardly curved section of upper frame at which the upper end of the damper is mounted is disposed forwardly of the seat, and thereofore, such projection part is defined at a point between the two thigh parts of an occupant sitting on the seat, which does not affect his or her sitting posture, yet such forward projection point at the seat proves to serves as a stopper by which the occupant's body is prevented from being thrown out forwardly in a collision case or the like.

(3) The downwardly curved section of lower frame defines a spacing at each of both lateral frame sections, with respect to the floor, as can be seen from FIG. 3, thus allowing the foregoing pair of slide rails to be installed in such spacing. Hence, the seat adjuster or the like may be provided in the suspension device without increasing the height of the device itself.

(4) The damper is disposed vertically without being compressed, and therefore, the repercussive force of damper is produced directly for giving a best cushiony effect to the suspension device. An optimal bottoming touch of the suspension device is thus attainable.

The present invention is not limited to the illustrated embodiment, but any other modifications, replacements and additions may structurally be possible without departing from the scopes and spirits of the appended claims. For example, the coil spring (51) may be covered with a bellows boot for long durability, and the upwardly and downwardly curved sections may be formed at the respective rearward frame members of upper and lower frames, instead of the embodiment shown.

What is claimed is:

1. A seat suspension device for an automotive seat, upon which a seat cushion of said seat is mounted, said seat suspension device comprising:
   a frame means having at least first and second forward and rearward members and being movable in an upward substantially vertical direction to raise said automotive seat and in a downward substantially vertical direction to lower said seat towards a floor of an automobile;
   an upward projection defining means for defining an upward projection adjacent said first forward frame member such that said upward projection projects toward said seat cushion;
   a downward projection defining means for defining a downward projection adjacent said second forward frame member such that said downward projection projects toward said floor of said automobile; and
   a damper means extending substantially vertically between said upward projection and said downward projection.

2. The seat suspension device according to claim 1, wherein said damper means is a hydraulic damper comprising a damper body having a piston rod, a compression coil spring wound around said piston rod, and an operation knob for adjusting a repercussive force of said compression coil spring.

3. The seat suspension device according to claim 1, wherein said frame means includes an upper frame including at least said first forward and rearward members and on which is mounted said seat cushion, a lower frame including at least said second forward and rearward members which is fixed to said floor of said automobile, and an X-shaped link means which is interposed between said upper and lower frames such as to permit substantially vertical movement of said upper frame relative to said lower frame, to thereby raise and lower said seat.

4. The seat suspension device according to claim 3, wherein a pair of slide rails are provided at respective lateral edges of said frame means, whereupon said lower frame is fixed via said two slide rails to said floor of said automobile.

5. The seat suspension device according to claim 1, wherein said upward projection defining means comprises an upwardly curved section which is formed centrally of said first forward frame member; and wherein said downward projection defining means comprises a downwardly curved section which is formed centrally of said second forward frame member, so that said damper means is extended between said upwardly and downwardly curved sections.

6. The seat suspension device according to claim 1, wherein said damper means is pivotally connected to said downward projection defining means and operatively connected to said upward projection defining means.

* * * * *